US012632902B2

(12) United States Patent
Kiarie et al.

(10) Patent No.: US 12,632,902 B2
(45) Date of Patent: May 19, 2026

(54) SYSTEMS AND METHODS FOR REAL ASSETS INVESTMENT AND SECURITIZATION ENGINE

(71) Applicant: Wells Fargo Bank, N.A., San Francisco, CA (US)

(72) Inventors: Muthoni Kiarie, San Francisco, CA (US); Patrick William Leary, San Francisco, CA (US); Arushi Sood Joshi, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 86 days.

(21) Appl. No.: 18/624,592

(22) Filed: Apr. 2, 2024

(65) Prior Publication Data

US 2025/0217884 A1      Jul. 3, 2025

Related U.S. Application Data

(60) Provisional application No. 63/616,452, filed on Dec. 29, 2023.

(51) Int. Cl.
*G06Q 40/04*       (2012.01)
*G06Q 40/06*       (2012.01)

(52) U.S. Cl.
CPC ............. *G06Q 40/04* (2013.01); *G06Q 40/06* (2013.01)

(58) Field of Classification Search
CPC .............................. G06Q 40/04; G06Q 40/06
USPC ...................................................... 705/35–45
See application file for complete search history.

(56) References Cited

U.S. PATENT DOCUMENTS

| | | | |
|---|---|---|---|
| 2022/0084120 A1* | 3/2022 | Khurana ............ | G06Q 30/0206 |
| 2022/0138732 A1* | 5/2022 | Kuchkovsky Jimenez ................. | |
| | | | G06Q 10/10 |
| | | | 705/44 |
| 2023/0153799 A1* | 5/2023 | Wilson, Jr. ............. | G06Q 40/04 |
| | | | 705/37 |

* cited by examiner

*Primary Examiner* — Robert R Niquette
(74) *Attorney, Agent, or Firm* — Foley & Lardner LLP

(57)       ABSTRACT

This technical solution can include multiple systems to facilitate asset exchange between a main network, one or more sub-networks, and a third-party network. The main network, one or more sub-networks, and the third-party network can each include a blockchain architecture to store the tokens corresponding to one or more owners of each of the networks. This technical solution can include generation of smart contract control structures and modification of blockchain architecture to process the tokens.

20 Claims, 5 Drawing Sheets

500

500

Create a first network within a second network          510

Transmit a request to a third network          520

Receive a number of tokens and a metadata object          530

Generate asset tokens          540

Execute the one or more smart contracts          550

SYSTEMS AND METHODS FOR REAL ASSETS INVESTMENT AND SECURITIZATION ENGINE

CROSS REFERENCE TO RELATED PATENT APPLICATION

The present application claims the benefit of and priority to U.S. Provisional Patent Application No. 63/616,452 filed Dec. 29, 2023, the disclosure of which is incorporated herein by reference in its entirety.

TECHNICAL FIELD

The present implementations relate generally to assets, and more particularly to digital asset exchange.

BACKGROUND

The present disclosure relates generally to assets, and more particularly to digital asset exchange. In a computer networked environment such as the internet, users and entities, such as people, organizations, or companies, may exchange digital assets.

SUMMARY

At least one aspect of the present disclosure relates to a method. The method can include creating, by one or more processors, a first network within a second network. The first network can include a blockchain including a set of protocols and a plurality of first nodes. Each node in the plurality of first nodes corresponding to an owner, a plurality of asset tokens, and a type for a tokenized asset. The second network can include a plurality of first networks to execute asset exchange amongst one or more first networks in the plurality of first networks. The method can include transmitting, by the one or more processors of the second network, a request to a third network. The third network can include a blockchain corresponding to a plurality of second nodes. The request can include the type for the tokenized asset, one or more nodes in the plurality of second nodes within the third network, and a number of tokens corresponding to the type for the tokenized asset. The method can include receiving, by the one or more processors of the second network. The number of tokens and a metadata object from the one or more specified nodes within the third corresponding to the second network or the first network. The method can include in response to receiving the number of tokens, generating, by the one or more processors, asset tokens by tokenizing the number of tokens to correspond to the plurality of asset tokens network and storing the metadata object within one or more nodes in the plurality of first nodes within the first network. The method can include executing, by the one or more processors, one or more smart contracts to apply the generated asset tokens to the one or more nodes in the plurality of nodes within the first network wherein applying the asset tokens to the one or more nodes can include storing, the generated asset token at the one or more nods within the blockchain of the first network.

At least one aspect of the present disclosure relates to a system can include a data processing system. The data processing system can include memory and one or more processors configured to create a first network within a second network, wherein the first network can include a blockchain can include a set of protocols and a plurality of first nodes wherein each node in the plurality of first nodes corresponding to an owner, a plurality of asset tokens, and a type for a tokenized asset, wherein the second network can include a plurality of first networks to execute asset exchange amongst one or more first networks in the plurality of first networks. The system can transmit, by the second network, a request to a third network, wherein the third network can include a blockchain corresponding to a plurality of second nodes, wherein the request can include the type for the tokenized asset, one or more specified nodes in the plurality of second nodes within the third network, and a number of tokens corresponding to the type for the tokenized asset. The system can receive, by the second network, the number of tokens and a metadata object from the one or more specified nodes within the third corresponding to the second network or the first network. The system can in response to receiving the number of tokens, generate asset tokens by tokenizing the number of tokens to correspond to the plurality of asset tokens network and storing the metadata object within one or more nodes in the plurality of first nodes within the first network. The system can execute one or more smart contracts to apply the generated asset tokens to the one or more nodes in the plurality of nodes within the first network, wherein applying the asset tokens to the one or more nodes can include storing, the generated asset token at the one or more nods within the blockchain of the first network.

BRIEF DESCRIPTION OF THE DRAWINGS

These and other aspects and features of the present implementations will become apparent to those ordinarily skilled in the art upon review of the following description of specific implementations in conjunction with the accompanying figures.

DETAILED DESCRIPTION

Figure 1:
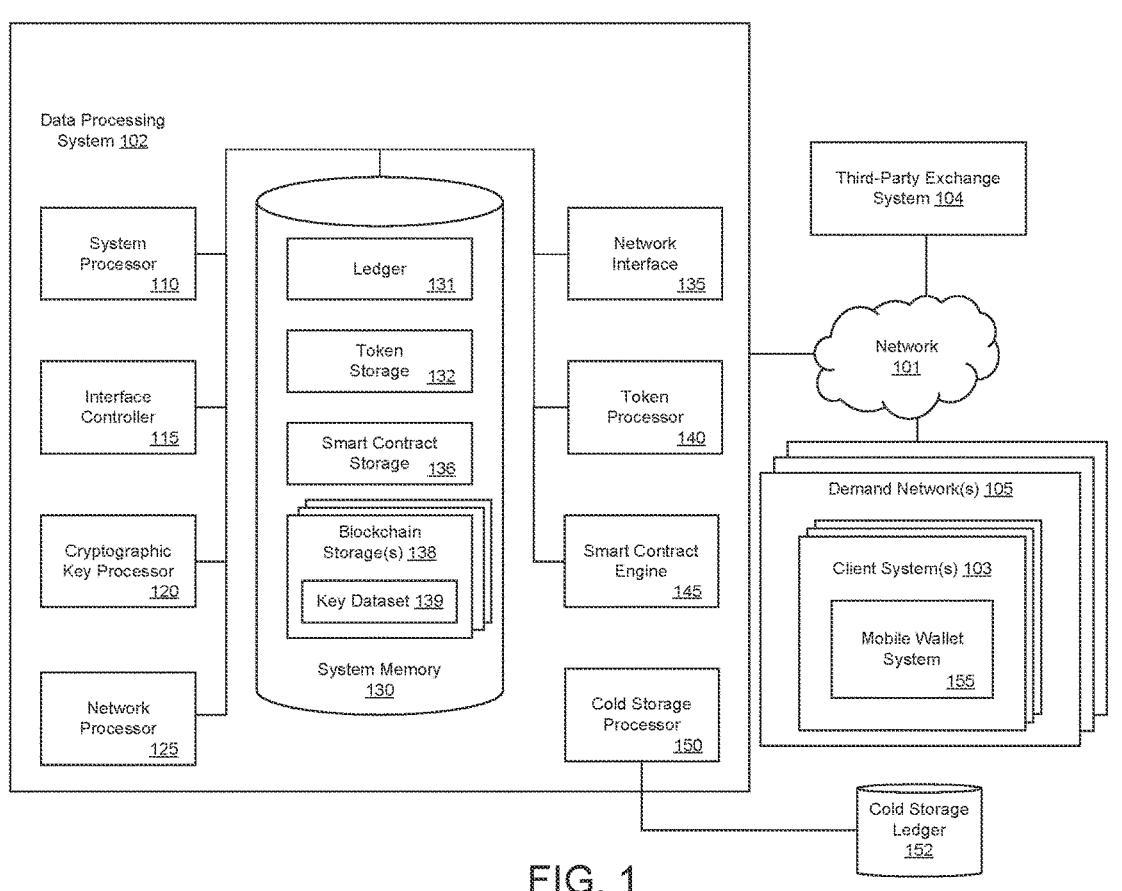
FIG. 1 depicts an example system, in accordance with present implementations.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

This technical solution can include a smart contract control structure that encapsulates a token. The smart contract control structure can allow output of various contents linked to the token upon determining at least one attribute (e.g., transferring attribute, outputting attribute, etc.) of a plurality of attributes is satisfied. For example, the smart contract control structure, and the token within the smart contract control structure, can be rendered unusable outside the particular computing environment. This technical solution can include multiple systems to facilitate asset exchange between a main network, one or more sub-networks, and a third-party network. The main network, one or more sub-networks, and the third-party network can each include a blockchain architecture to store the tokens corresponding to one or more owners of each of the networks. This technical solution can include generation of smart contract control structures and modification of blockchain architecture to process the tokens. A smart contract can, for example, generate or modify a smart contract to contain one or more tokens. The generator smart contract can search a blockchain to identify tokens satisfying particular attributes or parameters. The attributes can be transmitted to the generated smart contract by a token. The generated smart contract can generate a token that can include a non-fungible token (NFT), a semi-fungible token, or a fungible token, and can distribute that token while retaining locally the smart contract control structure and its restricted tokens.

The systems described herein provide improvements over typical asset exchange systems and data storage/access system. That is, the technical problem that arises from typical exchange systems and data systems occurs when clients of the typical asset exchange system need to raise money, want to earn a return, want liquidity, and want to be efficient. Typical asset exchange systems use a process which is manual, opaque, and inefficient. It can be difficult for investors to find new investing opportunities when constrained to the only a marketplace with a typical asset exchange system. Furthermore, liquidation challenges rise in typical asset exchange systems for certain types of assets as there is not an efficient method to unify different types of assets. Thus, to improve on the liquidation challenges and the inefficient process, a technical solution is accomplished by using a blockchain platform that connects capital with opportunity by interconnecting various networks to within a central network. This not only increases the scope of transactions within the blockchain platform but allows for secure asset exchange between other asset exchange systems. Furthermore, the system described herein may provide an improvement over typical asset exchange systems, data communication systems, and data storage/access systems through the process of using tokenized assets.

FIG. 1 depicts an example system. As illustrated by way of example of FIG. 1, the example system can include at least a network 101, a data processing system 102, client systems 103, a third-party exchange system 104, and demand networks 105.

The network 101 can include any type or form of network. The geographical scope of the network 101 can vary widely and the network 101 can include a body area network (BAN), a personal area network (PAN), a local-area network (LAN), e.g., Intranet, a metropolitan area network (MAN), a wide area network (WAN), or the Internet. The topology of the network 101 can be of any form and can include, e.g., any of the following: point-to-point, bus, star, ring, mesh, or tree. The network 101 can include a network which is virtual and sits on top of one or more layers of other networks 101. The network 101 can include any such network topology as known to those ordinarily skilled in the art capable of supporting the operations described herein. The network 101 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 101 can include a type of a broadcast network, a telecommunications network, a data communication network, or a computer network.

The data processing system 102 can include a physical computer system operatively coupled or that can be coupled with one or more components of the system 100, either directly or through an intermediate computing device or system. The data processing system 102 can include a virtual computing system, an operating system, and a communication bus to effect communication and processing. The data processing system 102 can include a system processor 110, an interface controller 115, a cryptographic key processor 120, a network processor 125, a network interface 140, a token processor 140, a smart contract engine 145, and a cold storage processor 160.

The system processor 110 can execute one or more instructions associated with the system 100. The system processor 110 can include an electronic processor, an integrated circuit, or the like including one or more of digital logic, analog logic, digital sensors, analog sensors, communication buses, volatile memory, nonvolatile memory, and the like. The system processor 110 can include, but is not limited to, at least one microcontroller unit (MCU), microprocessor unit (MPU), central processing unit (CPU), graphics processing unit (GPU), physics processing unit (PPU), embedded controller (EC), or the like. The system processor 110 can include a memory operable to store or storing one or more instructions for operating components of the system processor 110 and operating components operably coupled to the system processor 110. For example, the one or more instructions can include one or more of firmware, software, hardware, operating systems, embedded operating systems. The system processor 110 or the system 100 generally can include one or more communication bus controller to effect communication between the system processor 110 and the other elements of the system 100.

The interface controller 115 can link the data processing system 102 with one or more of the networks 101, the client systems 103, and the third-party exchange system 104, by one or more communication interfaces. A communication interface can include, for example, an application programming interface ("API") compatible with a particular component of the data processing system 102, the client system 103A, or the third-party exchange system 104. The communication interface can provide a particular communication protocol compatible with a particular component of the data processing system 102 and a particular component of the client system 103A or the third-party exchange system 104. The interface controller 115 can be compatible with particular metadata objects and can be compatible with particular metadata delivery systems corresponding to particular metadata objects. For example, the interface controller 115 can be compatible with transmission of video content, audio content, or any combination thereof. For example, the interface controller 115 can be compatible with payment processing transmissions by a protocol compatible with payment processing latency and encryption structures.

The interface controller 115 can establish a data channel between a source address and a destination address, such that receivals or transmissions of a token occurs between the addresses on a ledger (e.g., the blockchain storages 138) and/or a digital wallet (e.g., the client system 103). An address can be generated based on executing, by the cryptographic key processor 120, a math-based function (e.g., hash, symmetric encryption, asymmetric encryption) on a public key of a public and private key pair (or a verification key of a verification and signing key pair). For example, if the interface controller 115 receives a token from any system or device described herein, the token or other data received may include metadata associated with a source address, and the interface controller 115 may determine a destination address (e.g., may be provided to the system sending the token in advance) to store the token in the blockchain storage 138. In various arrangements, the addresses may be a unique sequence of randomized (or pseudo-randomized) numerical digits, characters, punctuation, whitespace, code (e.g., QR), or symbols.

The interface controller 115 can establish a data channel between a source network address and a destination network address, such that receivals or transmissions of a token occurs between the networks (e.g., demand networks 105) on the leger 131 or the blockchain storages 138 and/or the digital wallet. The source network and the destination address can be generated based on executing, by the cryptographic processor 120, the math-based function on a public key of a public and private key pair and executing, by the network processor 125, a securitization engine to securely connect to the source demand network and the destination demand network. For example, if the interface controller 115 receives a token from a network described herein, the token or other data received may include metadata associated with a source network address and establish a secure connection with the destination network address (e.g., provided by the metadata) to store the token int the blockchain storage 138.

The cryptographic key processor 120 can generate and modify cryptographic keys. For example, the cryptographic key processor 120 can include one or more asymmetric or symmetric key generators and can generate public-private key pairs. For example, a public-private key pair can include a public key configured to encrypt in accordance with a particular transform process. For example, a public-private key pair can include a private key configured to decrypt in accordance with a particular transform process compatible with the public key. In some arrangements, the cryptographic key processor 120 can link the public-private key pair with any individual object or component. In some arrangements, the cryptographic key processor 120 can link any public key or private key corresponding to the public-private key pair with any individual object or component.

For example, the cryptographic key processor 120 can generate a key compatible with or linked with a particular identifier corresponding to a particular, device, user, customer, account, system, or any combination thereof.

Upon receiving a token, the cryptographic key processor 120 can identify public keys and private keys associated with the token. Upon identifying one or more private keys of the token, the cryptographic key processor 120 can verify the token using the one or more identified private keys. In some embodiments, the token may have been previously stored on the data processing system 102 and the public-private key pairs may be stored throughout the data processing system 102 (e.g., in the blockchain storages 138, a cold storage ledger 162, etc.). In some arrangements, the received token may be an external token stored on a storage medium or a cache remote from the data processing system 102 (e.g., a digital wallet, a crypto-wallet, other storage mediums or caches, etc.), such as on the client system 103A or the third-party exchange system 104.

In some embodiments, the cryptographic key processor 120 can sign the token using a private key and verify the token using a public key. For example, signing the token can include encrypting the token using a specific private key to create a digital signature (e.g., biometric scan, fingerprint capture, passcode verification, etc.) and verifying the token can include decrypting the token using a specific public key to verify the digital signature of the specific private key, or an address of the specific private key. The address of the specific private can be a hashed version of the specific private key based on a hash function (e.g., hash table, hash map). The public and private key may be symmetric (e.g., use the same key to sign/verify) or asymmetric (e.g., use different keys to sign/verify). For example, each key of the public-private key pair may identical. In some arrangements, an algorithm (e.g., a hash algorithm, etc.) can be applied to a private key to generate a public key.

Generating private and public keys can include concatenating multiple public-private key pairs into a single public-private key pair based on merging, using a math-based function, multiple key pairs. For example, a wallet public key or wallet public-private key pair can be provided by the mobile wallet system 155 with a token (e.g., for deposit). The cryptographic key processor 120 can generate a new internal public-private key pair prior to storing the token. The math-based function can be, but is not limited to, a Rivest-Shamir-Adleman, elliptic curve cryptography, Digital Signature Algorithm, asymmetric algorithm, hash algorithm or function, or symmetric algorithm, and so on. For example, executing the math-based function can include generating (or aggregating) a concatenated public key based on executing a concatenation of the wallet public key and the additional public key and hashing, utilizing salting, the concatenated public key based on a hash function, where salting includes providing random data and the concatenated public key as input to the hash function. In particular, the "salt" can be random data such as random bits that is used as an additional input to a one-way function such as a hashes or encryption algorithm. A new salt can be randomly generated by the cryptographic key processor 120 each time salting occurs. Salting can occur based on a preference of a user depositing the token or in response to analyzing metadata of the token (e.g., based on value of the token or data stored in a metadata object).

In some embodiments, the cryptographic key processor 120 can also be configured to generate public and private key pairs and the interface controller 112 can be configured to provide public keys (or public and private key pairs, or private keys) to one or more computing devices (e.g., the client system 103A, the token collateral system 104, etc.) for use in a token collateral request. The interface controller 112 can interface (e.g., using an API) with one or more other ledger systems (other blockchain ledgers) and wallets (e.g., digital, crypto, etc.). In various embodiments, the public and private key pair can be generated based on a cryptographic function (e.g., symmetric-key algorithms (Data Encryption standard (DES), Advanced Encryption Standard (AES), etc.), asymmetric-key algorithms (Ed25519 signing, Elliptic Curve Cryptography (ECC), etc.), public-key algorithms (Rivest-Shamir-Adleman (RSA), etc.), etc.) and be stored in the data processing system 102. In various embodiments, the keys of the public and private key pairs may be stored in separate locations. For example, public keys may be stored in the key dataset 159 and the private keys may be stored in a cold storage ledger 152. In some embodiments, the public and private key pairs may be stored together (as one data package) in the key dataset 159. In some embodiments, the data processing system 102 can maintain (e.g., store and access keys) the key dataset 159 such that each token may be locked-unlocked and associated with a public key or public-private key pair stored on the key dataset 159. In various arrangements, public-private key pairs can be shared amongst a plurality of tokens or can be unique to each token on the blockchain storage 138.

Figure 4:
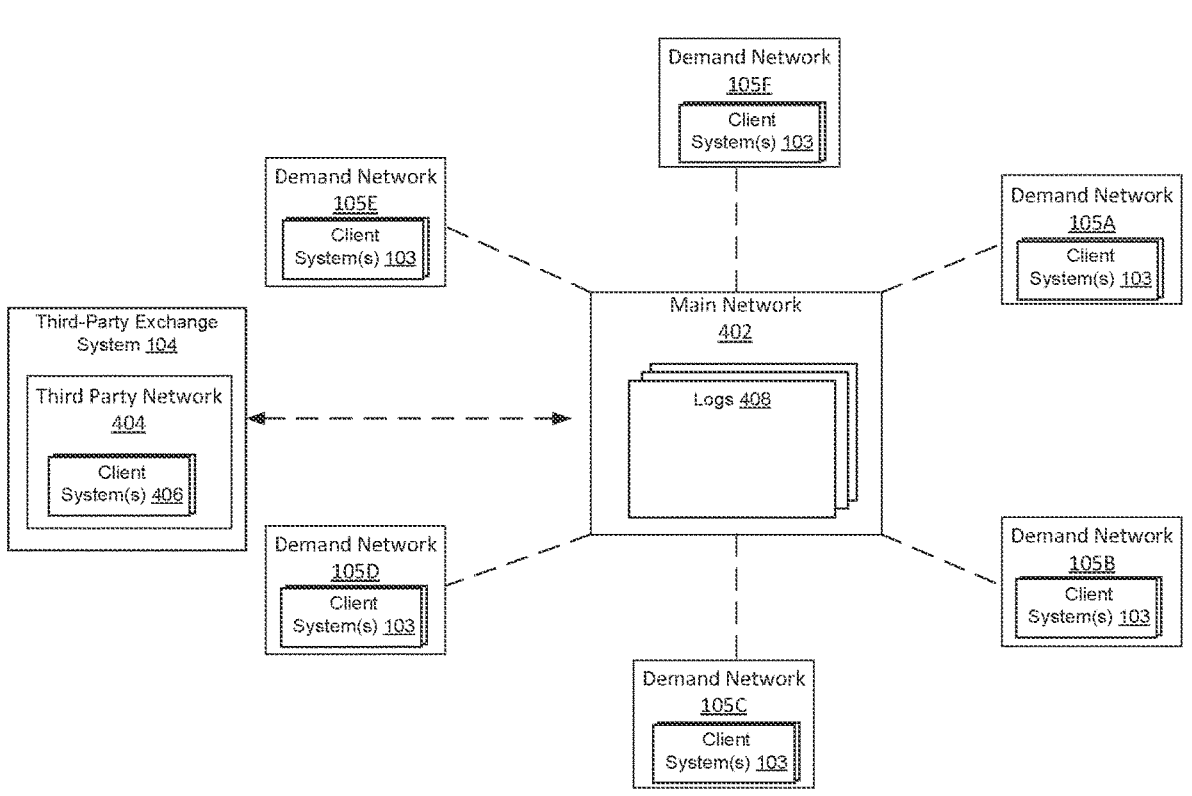
FIG. 4 depicts an example of interconnected networks for the digital asset architecture, in accordance with present implementations.

Referring now to FIG. 1 and FIG. 4, FIG. 4 depicts an example 400 of interconnected networks for the digital asset architecture. The network processor 125 can create one or more demand networks 105 within a main network 402. For example, a network processor 125 can create a demand network 105A and a demand network 105B within a main network 402. The main network can include a plurality of demand networks 105 to execute asset exchange amongst one or more demand networks 105. For example, a client system 103A in demand network 105A may transmit a loan request to the main network 402. A client system 103A in demand network 105B can accept the request. The main network 402 can signal the network processor 125 to start the exchange and the main network 402 can interconnect demand network 105A and demand network 105B.

The network processor 125 can be configured to execute the securitization engine on the demand networks 105. The securitization engine can convert illiquid assets into marketable securities within the demand networks 105. For example, a network processor 105 can execute a securitization engine on transactions between one or more demand networks 105. The network processor 125 can enforce permissions corresponding to each demand network 105. For example, a demand network 105A may only accept transactions where assets correspond to a loan. A network processor 125 can prevent non loan transactions from occurring in the demand network 105A. In some arrangements, the network processor 125 can verify public and private keys generated by the cryptographic key processor 120 associated with the demand networks 105.

The system processor 110 can receive a request including a tokenized deposit. The tokenized deposit can include asset tokens and a plurality of owners for the demand network 105A. For example, user device can use a network interface 135 to submit a request with a tokenized deposit. Th tokenized deposit can include asset tokens and one or more owners for a demand network 105A. The system processor 110 can transmit the request to the network processor 125 to cause the network processor 125 to create one or more client systems 103 based on the plurality of owners and create the mobile wallet system 155 based on the tokenized deposit within the request. The client system 103A can store the asset tokens, a type for the asset tokens, and an identification for the owner in metadata object of the client system 103A.

The network processor 125 can create one or more demand networks 105 within a main network in the system 100. For example, a network interface 140 can receive a request to create a demand network 105A. The network interface 140 can transmit the request to the network processor 125 to create the demand network 105A. The demand network 105A can include a blockchain with a set of protocols and a plurality of nodes (e.g., client systems 103). For example, a demand network 105A can include three client systems 103, where a protocol in the demand network 105A require the assets to only include bonds. In another example, a demand network 105A can include five client systems 103, where a protocol in the demand network 105A require the assets to only include loans and credit funds.

The demand networks 105 can each include a type for the network. The type for the network can be a classification for the owners of the demand networks 105. The type can be at least one of funds, corporates, investors, financial institutions, asset managers, or partners. For example, a demand network 105A can have a type of funds. The funds type indicates that the demand network 105A has a funds classification for the owners. In another example, a demand network 105A can have a type of institution. The funds type indicates that the demand network 105A has an institution classification for the owners. In another example, a demand network 105A can have a type of investor. The funds type indicates that the demand network 105A has an investors classification for the owners.

The demand networks 105 can include one or more permissions and a plurality of clients associated with the client systems 103. The one or more permissions can limit the plurality of owners from accessing other demand networks 105. For example, clients in demand network 105A cannot access clients in demand network 105B. In this manner, the one or more permissions ensure privacy amongst the demand networks 105. In order to access other demand networks 105, a request may be sent from a client system 103A to the main network 402 to broadcast the request. The demand networks 105 can notify the clients system of the broadcasted request to provide temporary access to the demand network 105 of the request.

The client systems 103 (e.g., computing system, device, etc.) may be a mobile computing device, desktop computer, smartphone, tablet, smart watch, smart sensor, or any other device configured to facilitate receiving, displaying, and interacting with content (e.g., web pages, mobile applications, such as decentralized application (dApp), etc.). The client systems 103 may include an input/output circuit for communicating data over the network 101 to the data processing system 102 and/or the third-party exchange 104. In some arrangements, each of the client systems 103 can have a digital wallet address for exchanging (e.g., receiving or sending) fungible or non-fungible values (e.g., cryptocurrency, digital currency, stocks, bonds, loan, deed, etc.).

The client systems 103 can include a computing system located remotely from the data processing system 102. The client systems 103 can include a mobile wallet system 165. The mobile wallet system 165 can include an interface to execute instructions corresponding to a particular wallet account, and to modify the structure or contents of a particular smart contract corresponding to a wallet account. For example, the mobile wallet system 165 can include a user interface to receive input indicating selections of various tokens, transactions, accounts, devices, users, or systems. The user interface can include a graphical user interface that can be presented at a display device. The display device can display at least one or more user interface presentations and can include an electronic display. An electronic display can include, for example, a liquid crystal display (LCD), a light-emitting diode (LED) display, an organic light-emitting diode (OLED) display, or the like. The display device can receive, for example, capacitive or resistive touch input. The mobile wallet system 165 can transmit one or more instructions, tokens, keys, or any combination thereof to, from, or with the data processing system 102.

The client systems 103 can include data fields regarding information about an owner of a respective client system 103A. The data fields can include tokens corresponding to a client and a type for the tokenized asset. For example, a client system 103A can include a data field to indicate a client "John Doe" with tokenized assets correspond to a loan type. The data field can be visible to other client systems 103 within the demand network 105A. For example, a client system 103A owned by "John Doe" can be visible to a client system 103B owned by "Joe Smith." The owners may not access the tokenized assets of other client systems 103.

The token processor 140 may identify one or more characteristics of tokens. For example, the token processor 140 may identify one or more characteristics of an individual token or a plurality of tokens satisfying criteria. The criteria by which tokens can be identified can include aspects of the token, fields, or components of the token, transform processes used to generate or modify the token, aspects of a metadata object linked with the token, or any combination thereof. For example, aspects of the token can include a hash of the token, or a value of an individual field of the token. The token processor 140 can generate a trait corresponding to one or more characteristics of a token or an object linked with the token. For example, the trait can include a scalar or vector quantity corresponding to one or more values of an aspect of the token. The trait can include a numeric value corresponding to an identifier of the token. In some embodiments, the token may be a fungible or an NFT.

The smart contract engine 145 (e.g., smart contract processing circuit, etc.) can generate and modify one or more smart contracts. The smart contract engine 145 can execute instructions to generate or modify a cryptographic container, to add or remove objects from a cryptographic container, and to execute various processors linked with or embedded with a smart contract. For example, the smart contract engine 145 can execute various processors of a smart contract in response to detecting input including or corresponding to a particular token at the smart contract. In another example, the smart contract engine 145 can include processors to read, write, generate or modify one or more objects contained within a container of the smart contract, one or more tokens input to the smart contract, or one or more processors of the smart contract. Furthermore, the smart contract engine 145 can obtain one or more tokens from the token processor 140, against one or more smart contracts. For example, the smart contract engine 145 can obtain one or more tokens from the token processor 140 to compare the one or more tokens against a particular one or more tokens requested by one of the one or more smart contracts.

The client systems 103 within one or more demand networks 105 can connect to the third-party network 404 using a secure connection stablished by the network 101 and the network processor 125. The secure connection can include a set of restrictions based on the set of protocols for the respective demand networks 105. For example, a network processor 125 can use a hypertext transfer protocol secure to establish a secure connection between a client system 103A within a demand network 105A to a third-party network 404. In another example, a network processor 125 can use a TLS/SSL library to establish a secure connection between a client system 103A within a demand network 105A to a third-party network 404. In another example, a network processor 125 can use a data encryption to establish a secure connection between a client system 103A within a demand network 105A to a third-party network 404. The set of restrictions can limit the information within the request to protect the client of the client system 103A within the one or more demand networks 105 because the third-party network 404 may access the public-private key par associated with the client system 103A. For example, one restriction in the set of restrictions can hide a name of a client system 103A. In another example, one restriction in the set of restrictions can limit metadata associated with a demand network 105A to prevent a third-party network 404 from identifying the demand network 105A. The secure connection can ensure the assets corresponding to the client systems 103 are not subject to fraudulent activity.

The main network 402 can transmit the request to the third-party exchange system 104. For example, a client system 103A can transmit a request to a main network 402. The main network 402 can broadcast the request to one or more demand networks 105. If the request is not accepted by the demand networks 105, the main network 402 can transmit the request to a third-party network 404 of a third-party exchange system 104. The third-party network 404 can include a plurality of blockchains with a plurality of client systems 406. The client system 406 can be the same as the client systems 103. For example, a client system 406 can similar data fields to a client system 103. The request can include the type for the tokenized asset, one or more client systems 406 in the third-party network 404, and a number of tokens corresponding to the type for the tokenized asset. For example, a request from the main network 402 can have a loan type for the tokenized assets and 100 tokens to be transferred to a client system 103A within demand network 105A.

Figure 2:
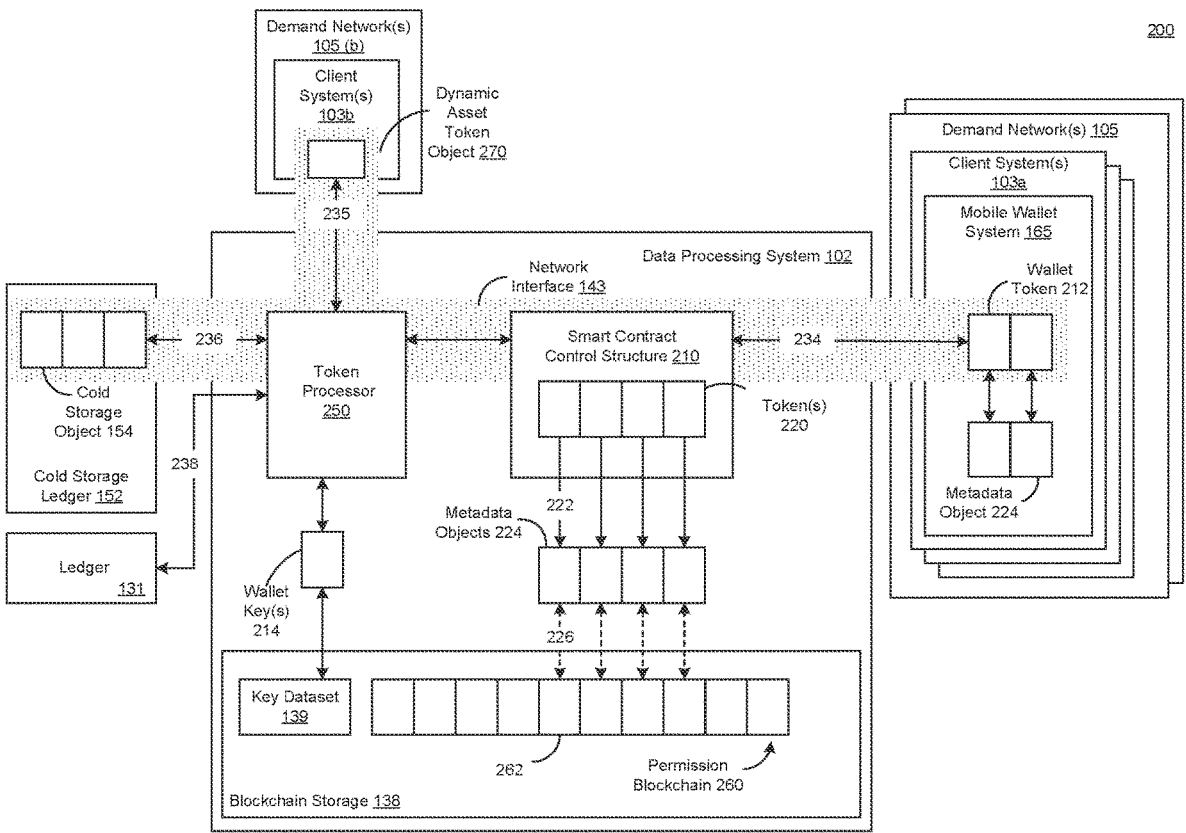
FIG. 2 depicts an example digital asset architecture, in accordance with present implementations.

Referring to FIG. 1 and FIG. 2, FIG. 2 depicts an example digital asset architecture. The example digital asset architecture 200 can include at least the data processing system 102, the client system 103A, the client system 103B, the ledger 151, the blockchain storage 138, the key dataset 159, the mobile wallet system 155, the network interface 135, the cold storage ledger 152, the cold storage object 154, a smart contract control structure 210, wallet tokens 212, wallet key(s) 214, one or more tokens 220, one or more metadata links 222, one or more metadata objects 224, one or more blockchain links 226, internal key(s), a client link 234, a client link 235, a cold storage link 236, a ledger link 238, a token transaction processor 250, a permission blockchain 260 with one or more blocks 262, and a dynamic asset token object 270.

The network processor 125 can receive the number of tokens 220 and one or more metadata objects 224 from one or more client systems 406 of the third-party network 404. For example, a third-party exchange system 104 can transmit a number of tokens 220 and a metadata object 224 to a main network 402. The main network 402 can transfer the number of tokens 220 and the metadata object 224 to a demand network 105A corresponding to a request for the number of tokens. The metaobjects 224 within the client systems 406 of the third-party network 404 can be the same as the metadata objects 224 in the client systems 103 of the demand networks 105. The metadata objects 224 can include information regarding the client of the client system 103A. The metadata object 224 can include a transaction ID, a timestamp, a type for the number of tokens, and client information. For example, a metadata object 224 can include a client's name. In another example, a metadata object 224 can include a funds type for the number of tokens.

The network interface 135 can communicate with one or more external systems and networks compatible with transferring a token. For example, the network interface 135 can include an application programming interface (API) compatible with the third-party exchange system 104 and the client system 103A. For example, the network interface 135 can be configured to receive characteristics associated with particular tokens, types of tokens, or metadata objects linked with the particular tokens. In some arrangements, the network interface 135 can be configured to receive particular quantitative values corresponding to particular transfer of tokens between accounts and networks. The network interface 135 can thus provide the technical improvement of transmitting and receiving tokens from within the demand networks 105 and the third-party network 404. The network interface 135 can provide the technical improvement of providing an interface compatible with particular token transfer operations between networks (e.g., demand networks 105, third party networks 404).

The token processor 140 can determine an asset within the demand networks 105 by identifying an asset ID in the received tokens, from the third-party network 404, corresponding to the respective demand network 105A. The token processor 140 can parse the received asset tokens to identify an asset ID. In some arrangements, the asset ID can be directly listed within the metadata object 224 associated with the received asset tokens. For example, a third-party network 404 can transmit tokens 220 to a main network 402. The token processor 140 can parse the tokens 220 to identify an asset ID to create an associated between the received tokens 220 and a respective client system 103A within a respective demand network 104. The data processing system 102 can generate one or more blocks 262 within the blockchain storage 138. Each block in the one or more blocks correspond to the received token 220 to update the mobile wallet system 155 of the respective client system 103*a*. For example, in response to receiving tokens 220, a data processing system 102 can generate one or more blocks 262.

In response to receiving the number of tokens, a token generator (e.g., token generator 360 described herein) can generate asset tokens. The token generator 360 can generate the asset tokens by tokenizing the number of tokens 220 to correspond to the plurality of asset tokens at the demand network. For example, the network interface 135 can transmit a received number of tokens to a token generator 360 and instruct the token generator 360 generate asset tokens based on a plurality of asset tokens in the demand networks 105 corresponding to a request. The received number of tokens can be transmitted to the cold storage ledger 152. The network processor 125 can store the metadata object 224 within the client system 103A at the demand network 105A to update the mobile wallet system 155 based on the change. For example, a transaction ID field in a metadata object 224 can be extracted to update a client system 103A with the new transaction ID.

The smart contract engine 145 can apply the generated asset tokens to the one or more client systems 103 of the respective demand network 105A. For example, a smart contract engine 145 can analyze and parse generated asset tokens to determine a respective client system 103A within a respective demand network 105A for the storage of the generated asset tokens. The smart contract engine 145 can detect whether a particular token is compatible with a particular smart contract by detecting whether the particular token matches a particular token characteristic associated with the particular smart contract. For example, the smart contract engine 145 can detect that a token is compatible with a smart contract based on comparing a hash of the token with a hash included in the smart contract. To apply the generated asset tokens, the smart contracts within the smart contract storage 136 can store the generated asset tokens within the respective client system 103A.

The system processor 110 can generate a log 408 of transactions to maintain a record of transactions within the main network 402. The log 408 can include the number of tokens involved in the transaction and information within a metadata object. The system processor 110 can store the logs 408 in the main network 402 or in the system memory 130. The system memory 130 can maintain a log 408 for all transactions within each of the demand networks 105. In some arrangements, the log 408 can maintain a record of transactions between the main network 402 and the third-party network 406. For example, a log 408 can include a transaction between demand network 105A and demand network 105B. The transaction can be for 50 tokens between "John Doe" and "Joe Smith." In another example, a log 408 can include a transaction between demand network 105A and demand network 105B. The transaction can be for 1 token between "John Doe" and "Joe Smith." In another example, a log 408 can include a transaction between demand network 105A and a third-party network 404. The transaction can be for 30 tokens between "John Doe" and "Joe Smith."

The client systems 103 can include an identity token. The identity token can indicate a form of identification for an owner of the demand network 105A. The set of protocols for the demand network 105A can validate the form of identification to enable asset exchange within the demand network 105A. The form of identification can include at least one of a Social Security Number (SSN), Passport, Identification Card, Birth Certificate, or a Driver's License, among others. The set of protocols can include identity proofing, biometric authentication, username/password, multi-factor authentical, or public key infrastructure among others. For example, an owner of a demand network 105A can submit a driver's license and conduct a biometric scan to validate the drivers' license. In another example, an owner of a demand network 105A can submit an SSN number and create a username and password to participate in the demand network 105A.

The network processor 125 can use the identity token to determine a geolocation for the owners of the demand networks 105. A protocol in the set of protocols can define the geolocation for the demand network 105A. For example, a protocol can establish a geolocation to be Maryland, therefore the owners of demand network 105 must be in Maryland to access the client system 103A. In another example, the geolocation can be a 100-mile radius between owners, therefore two owners can be transactions within a 100-mile radius of each other. The geolocation can be determined by using a Global Position System (GPS), Wi-Fi Positioning, Cellular Triangulation, or Bluetooth beacons among others.

The cold storage processor 150 can execute one or more actions with respect to generating (or creating), updating, protecting, and/or destroying cold storage objects in the cold storage ledger 152. In some arrangements, the cold storage processor 150 can communicate with the cold storage ledger 152 via an intermittent secure connection. In some arrangements, the process of establishing an intermittent secure connection can include disconnecting the data processing system 102 from all networks (e.g., internet connections, wired connections, etc.) and connecting via a wired network connection or a wired or wireless local network connection (e.g., local area network (LAN), intra-network, etc.). The connection can be intermittent or discontinuous since the data processing system 102 can perform many functions without having to access the cold storage ledger 152. However, in some arrangements, when an exchange of a token stored on the data processing system 102 is initiated, an intermittent secure connection may be established. In various arrangements, the customer with a token account or the data processing system 102 can add an attribute to each metadata object indicating whether a cold storage exchange must occur when exchanging the particular token. As used herein, "cold storage exchange" refers to the process of performing an exchange of a token using a cold storage object stored on the cold storage ledger 152.

In various arrangements, any data shared over the intermittent secure connection can be encrypted and/or secured (e.g., hashed, password protected, etc.) to prevent unauthorized parties from performing unauthorized actions on the intermittent secure connection. For example, a masking algorithm may be executed performing bitwise operations (e.g., NOT, AND, NAND, OR, XOR, Complement, left-shift (logical or arithmetic), right-shift (logical or arithmetic), rotate right, rotate left, etc.) on any data transferred over the intermittent secure connection. All communications over the intermittent secure connection can be encrypted with one or more secure network protocols (e.g., Secure Shell (SSL), Kerberos, IPSec, Secure Sockets Layer (SSL), Hypertext Transfer Protocol Secure (HTTPS), etc.) implemented utilizing a cryptographic function (e.g., symmetric encryption, asymmetric encryption, hashing, etc.). In some examples, the cryptographic function could be a homomorphic encryption function. In some examples, the cryptographic function could be any symmetric encryption function (e.g., Triple Data Encryption Standard (TDES), RC5, AES, Blowfish, CAST, etc.), and/or asymmetric encryption function (e.g., RSA, Efficient and Compact Subgroup Trace Representation (ECSTR or XTR), Digital Secure, Escrowed Encryption Standard (EES), etc.).

In general, a cold storage object can be a data structure that can be structured and formatted for storing data about tokens. For example, each token can include a linked metadata object and the metadata object may include protected and unprotected data. As used herein, "protected data" can include sensitive data such as, but not limited to, social security numbers (SSN), passport number, deoxyribonucleic acid (DNA), financial account number, other personal identifying information, biometric information, geolocation data indicating one or more locations of a person, photographs of people, criminal records, credit and/or payment card numbers, health data, and the like, whereas "unprotected data" can include data not considered sensitive data. In various arrangements, the data processing system 102 can analyze, based on accessing the link of the token, the metadata object to determine if any protected data is present. In some arrangements, when protected data is present, the cold storage processor 150 may update the metadata object by extracting the protected data and storing the protected data in a newly generated cold storage object. For example, the data processing system 102 can determine, via the link of the token, a first portion of metadata of the metadata object of the token associated with protected data of the token and a second portion of metadata of the metadata object of the token associated with unprotected data of the token, where the first portion of metadata does not contain any data from the second portion of metadata. In some examples, the cold storage processor 150 can remove or extract the first portion of metadata of the metadata object of the token based on accessing the metadata object via the link, and in turn generate a cold storage object with the protected data and the cold storage private key.

The system memory 160 can store data associated with the system 100. The system memory 160 can include one or more hardware memory devices to store binary data, digital data, or the like. The system memory 160 can include one or more electrical components, electronic components, programmable electronic components, reprogrammable electronic components, integrated circuits, semiconductor devices, flip flops, arithmetic units, or the like. The system memory 160 can include at least one of a non-volatile memory device, a solid-state memory device, a flash memory device, and a NAND memory device. The system memory 160 can include one or more addressable memory regions disposed on one or more physical memory arrays. A physical memory array can include a NAND gate array disposed on, for example, at least one of a particular semiconductor device, integrated circuit device, or printed circuit board device. The system memory 160 can include a ledger 131, a token storage 132, a smart contract storage 136, and a blockchain storage 138 including a key dataset 139.

The ledger 131 can store the associations of tokens with token accounts (e.g., the association between a token account and the tokens owned or partially owned by the token account), while the blockchain storage 138 can store portions of tokens (e.g., smart contracts containing information pointing to the off-chain content and metadata, such as data stored in the token storage 132) and keys of the token (e.g., stored in the key dataset 139). For example, the content and metadata of the token may be stored in an on-chain hash that can point to a storage location of the content and metadata.

The token storage 132 can store one or more tokens and corresponding addresses for particular tokens that indicate links with the corresponding tokens. The token storage 132 can include tokens associated with the data processing system 102 or any component thereof, the client systems 103 or any component thereof, any metadata object, or any combination thereof. In some arrangements, the token storage 132 can store one or more fungible tokens, semi-fungible tokens, and/or non-fungible tokens. The token storage 132 can store corresponding addresses for particular fungible tokens that indicate links with the corresponding fungible tokens, corresponding addresses for particular semi-fungible tokens that indicate links with the corresponding semi-fungible tokens, and/or corresponding addresses for particular non-fungible tokens that indicate links with the corresponding non-fungible tokens.

The smart contract storage 136 can store one or more smart contracts and corresponding addresses for particular smart contracts that indicate links with the corresponding smart contracts. The smart contract storage 136 can also store one or more control structures and their contained metadata objects and corresponding addresses for particular control structures that indicate links with the corresponding control structures.

The blockchain storage 138 can store one or more blockchains linked to one or more smart contracts, tokens, control structures, or metadata objects, by corresponding addresses for particular smart contracts, tokens, control structures, or metadata objects that indicate links with a particular blockchain.

The key dataset 139 can store cryptographic keys associated with the data processing system 102 or any component thereof, the client system 103 or any component thereof, any metadata object, or any combination thereof. For example, the key dataset 139 can include public-private key pairs or private keys corresponding to particular accounts, tokens, smart contracts, devices, users, systems, or any combination thereof.

Referring again to FIG. 2, The mobile wallet system 155 can include one or more tokens and keys corresponding to various account and linked with the client system 103a. For example, the mobile wallet system 155 can encapsulate one or more tokens linked with the client system 103a within a secure container and can include an interface compatible with the token transaction processor 250, the third-party exchange system 104, and the network interface 135. The mobile wallet system 155 can include wallet tokens 212. The wallet tokens 212 can each include a particular token and can correspond to particular metadata objects 224. A token of the wallet tokens 212 can be associated with a particular metadata object 224 and can be required to transmit output of the metadata object 224, transfer the metadata object 224 to another storage location, or any combination thereof, for example. Each of the wallet tokens 212 can indicate control of a particular metadata by a particular user linked with the mobile wallet system 155 via a cryptographic key or key pair.

The wallet key(s) 214 can include a key compatible with the wallet token 212. The wallet key(s) 214 can be stored in the key dataset 139 and received by a token authenticator processor 312 via a wallet key transmission 304 (as disclosed herein with respect to FIGS. 3 and 4). The mobile wallet system 155 can execute a transaction or modify metadata of the wallet token 212 in response to detecting input including the wallet key 214. The wallet keys 214 can, for example, include a wallet public-private key pair, a wallet public key, or a wallet private key compatible with the mobile wallet system 155. The mobile wallet system 155 can permit access to the wallet token 212 based on the wallet key(s) 214, for example, compatible with the encapsulation layer and operable to decrypt the encryption corresponding to the encapsulation layer.

The smart contract control structure 210 can include one or more instructions to apply and transmit output of one or more of the tokens 220. The smart contract control structure 210 can correspond to an executable smart contract and can include a gateway component. The gateway component can include one or more instructions to restrict or prevent output of the tokens 220 in the absence or presence of one or more tokens compatible with the smart contract control structure 210. The smart contract control structure 210 can include an encapsulation layer that (shown as smart contract control structure 210), for example, maintains the tokens in an encrypted state. The smart contract control structure 210 can permit access to the tokens based on a private key, for example, compatible with the encapsulation layer and operable to decrypt the encryption corresponding to the encapsulation layer. The gateway component can be compatible with and interface with the network interface 135, and the encapsulation layer can be integrated with the smart contract control structure 210. The smart contract control structure 210 can be registered to the permission blockchain 260 by a block link with the permission blockchain 260.

The wallet token 212 can identify a token and can identify one or more characteristics linked with the token or corresponding to a request to transfer the token (e.g., asset, update). For example, the wallet token 212 can include an identifier of the token, a hash of the token, an identifier of a token account linked with the token, a token account linked with the request to transfer the token, an identifier of a public-private key pair or any portion thereof, or any combination thereof. For example, the wallet token 212 can include an identification of a public-private key pair corresponding to a smart contract control structure of an owner of a token. In another example, the wallet token 212 can include an identification of a public-private key pair corresponding to a smart contract control structure of a buyer of a token. The client link 234 can transmit the wallet token 212 from the client system 103a or the mobile wallet system 155 to the data processing system 102 (in particular, the token transaction processor 250) or the smart contract control structure 210.

The token transaction processor 250 can execute one or more actions with respect to various cryptographic keys, tokens, containers, control structures, and smart contracts. For example, the token transaction processor 250 can modify links between various containers, control structures, token, and smart contracts with various public-private key pairs. The token transaction processor 250 can transfer public-private key pairs based on one or more operations of the cryptographic key processor 120, for example. The token transaction processor 250 can generate and modify one or more metrics corresponding to various tokens, including the wallet tokens 212 and the tokens 220, based on one or more operations of the token feature processor 130 or the token metrics engine 140. The token transaction processor 250 can generate or modify one or more containers, tokens accounts, or smart contracts, based on one or more operations of the smart contract engine 150.

The token transaction processor 250 can execute one or more actions with respect to generating the cold storage objects 184 and storing the cold storage objects 184 in the cold storage ledger 152. In some arrangements, the token transaction processor 250 can establish an intermittent secure connection with the cold storage ledger 152 over the cold storage link 236. The token transaction processor 250 can also execute one or more actions with respect to generating token accounts for the ledger 131, recording associations of tokens 220 with one or more token accounts of the ledger 131, and updating the ledger 131. In some arrangements, the token transaction processor 250 can establish a connection with the ledger 131 over the ledger link 238.

The permission blockchain 260, within the blockchain storage 138, can include at least one blockchain including one or more of the blocks 262. The permission blockchain 260 can be linked with one or more of the metadata objects 224, the tokens 220, or the smart contract control structures 210. The permission blockchain 260 can include a blockchain operated and controlled at the data processing system 102. The permission blockchain 260 can include a plurality of blockchains each corresponding to particular aspects of the links associated with the corresponding blockchains. The permission blockchain 260 can include the blocks 262, and the key dataset 139 can include the wallet keys 214, the internal keys 228, and/or other keys such as cold storage keys. The blocks 262 can include or store links to one or more objects associated with the permission blockchain 260. The keys stored in the key dataset 139 can include a reference, pointer, or the like, to or between a block among the blocks 262 and the keys associated with that particular block. For example, the internal key 228 can include a reference, pointer, or the like, to or between a block among the blocks 262 and the internal key 228 associated with that particular block.

In some arrangements, the token transaction processor 250 can establish a secure connection with the client system 103*b* over the client link 23. The client link 235 can include a transmission path or communication path between the dynamic asset object 270 and the token transaction processor 250 by the network interface 135. At least one network interface 135 or the token transaction processor 250 can detect the dynamic token exchange object 270 via the client link 235.

Figure 3:
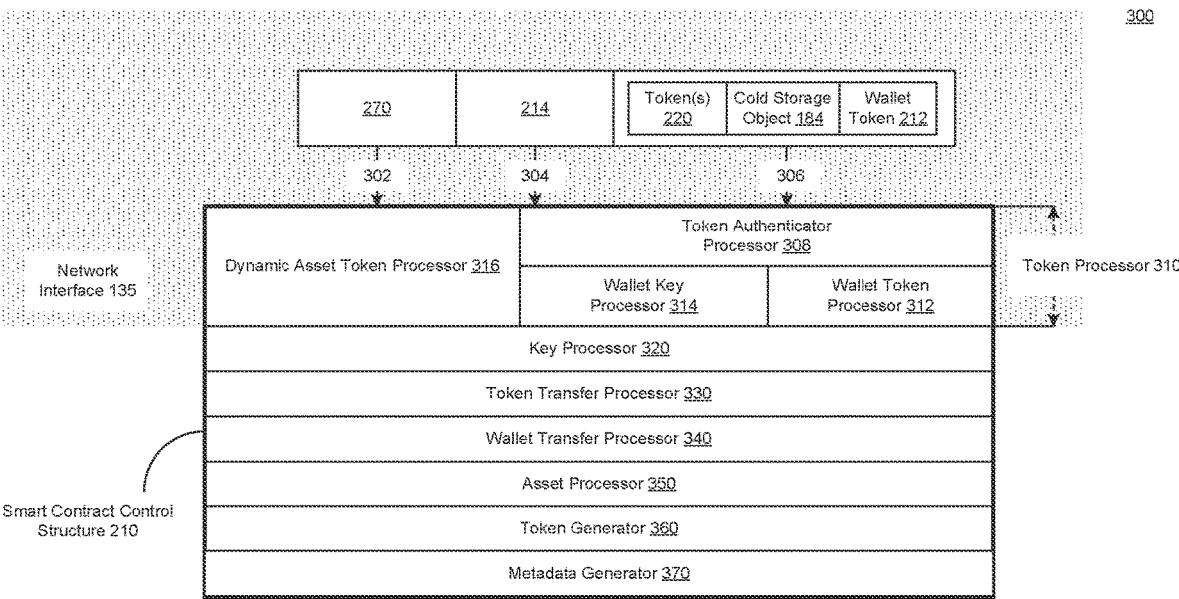
FIG. 3 depicts an example digital asset architecture, in accordance with present implementations.

FIG. 3 depicts an example digital asset architecture 300. The digital asset architecture 300 can include at least the network interface 140, smart contract control structure 210, an internal key transmission 302, a wallet key transmission 304, and a token/object transmission 306, a token processor 310 including a token authenticator processor 312, a wallet-internal token processor 314, a wallet-internal key processor 316, and an internal key processor 318, a dynamic token exchange processor 319, a key processor 320, a token transfer processor 330, a wallet transfer processor 340, an asset processor 350, a token generator 360, and a metadata generator 370.

The internal key transmission 302 can be responsive to an action by the network interface 135 to transmit the internal key 228 to the smart contract control structure 210. The wallet key transmission 304 can be responsive to an action by the network interface 135 to transmit the wallet key 214 to the smart contract control structure 210. The token/object transmission 306 can be responsive to an action by the network interface 135 to transmit the wallet token 212, the restricted token 220, and/or the cold storage object 154 to the smart contract control structure 210. That is, the token/object transmission 306 can be one or more of the wallet tokens 212, the restricted token 220, and/or the cold storage object 154 received from one or more of the cold storage ledgers 152, the blockchain storage 138, and/or the mobile wallet system 155, via the network interface 135.

The token processor 310 can query the ledger 131 for token account information associated with the restricted token 220 or the wallet token 212. For example, in response to the token processor 310 receiving the restricted token 220 or the wallet token 212, the token authenticator processor 312 can determine if a token account has been generated for the received restricted token 220 or the wallet token 212. In the above example, if a token account has been created, the token processor 310 may update the ledger 131 recording the token identifier with a particular token account. In yet the above example, if a token account has not been created, the token processor 310 may provide the ledger 131 with information to generate a token account and record the token identifier with the newly generated token account.

The token processor 310 can communicate with, authenticate, and update various tokens and NFTs. The token processor 310 can include one or more interfaces corresponding to an API or a smart contract interface, for example. A smart contract interface can include one or more executable instructions integrated with a smart contract. The smart contract interface can execute instructions at the smart contract or triggered by the smart contract in response to detection of objects or conditions external to the smart contract. The token processor 310 can include at least a portion of a control structure of the smart contract.

The token authenticator processor 312 can detect the presence of a fungible token or non-fungible token and can determine whether the token is compatible with the smart contract control structure 210. The token authenticator processor 312 can be configured to be compatible with a particular fungible token or can be generated to be compatible with a particular fungible token. The token authenticator processor 312 can be configured to be compatible with a plurality of tokens having a particular characteristic or can be generated to be compatible with a plurality of tokens having a particular characteristic. A particular characteristic can include, for example, a particular identifier or portion of an identifier of a token. For example, the token authenticator processor 312 can be integrated with or store a hash based on a particular fungible token and a hash processor operable to generate a hash based on any fungible token. The token authenticator processor 312 can generate a hash in response to detecting the presence of the fungible token and can determine whether the fungible token is compatible with the smart contract control structure 210, in response generating the hash, by comparing the generated hash with the stored hash. The token authenticator processor 312 can include logic to detect a fungible token passed to it, by, for example, an activation instruction from the network interface 135.

In some arrangements, the token authenticator processor 312 can authenticate links of tokens based on successfully accessing, via the link, the metadata object of the tokens. The link can be the TokenURI (a unique identifier of what the token "looks" like) or another link that can be provided to a token lookup table, a Uniform Resource Locator (URL), a world-wide-web address, an internal network address, a Hypertext Transfer Protocol Secure (HTTPS), an Interplanetary File System (IPFS) hash, and so on. In various arrangements, authenticating the link can include scanning and/or analyzing a token exchange, such as the third-party exchange system 104, to verify the received token is not stored on or being sold on the token exchange. In some arrangements, the token authenticator processor 312 can also collect on-chain data related to the token by accessing the previous public address (prior to transferring the token and encapsulating it within the smart contract control structure 210) and determine if the on-chain data (e.g., previous transaction history, owner, metadata, etc.) is consistent with the metadata of the received token.

The wallet-internal token processor 314 can detect the presence of the wallet token 212, the restricted token 220, and/or the cold storage object 154, and can extract one or more attributes, parameters, aspects, or values, or any combination thereof, from at least one of the wallet tokens 212, the restricted token 220, and/or the cold storage object 154. The wallet-internal token processor 314 can be configured to be compatible with the wallet token 212, the restricted token 220, the cold storage object 154, the network interface 135, the third-party exchange system 104, and/or the mobile wallet system 155. Thus, the wallet-internal token processor 314 can provide a technical improvement of direct communication between the data processing system 102, the mobile wallet system 155, the third-party exchange system 104, the cold storage ledger 152, and the ledger 131. The wallet-internal token processor 314 can include a token profile or exchange profile corresponding to a particular token exchange system and compatible with a particular token.

The key processor 320 can generate, transfer, and modify various cryptographic keys. The key processor 320 can transfer one or more of the account key pairs (e.g., the wallet keys 214, the internal keys 228, etc.) to or from the container 320 of the smart contract control structure 210. For example, the key processor 320 can transfer a cryptographic key pair, a public key, a private key, a symmetric key, or any combination thereof, to or from the container 320 to indicate a change in control of a particular token account to the container 320. The key processor 320 can authenticate the container 320 to a particular token account in the ledger 131 based on a key of the container 320. For example, the key processor 320 can identify a token account associated with the internal keys 228 (e.g., internal public-private key pair). For example, the key processor 320 can transmit a hash based on the internal keys 228 to the mobile wallet system 155 associated with the token account, to authenticate the container 320 to the token account associated with the internal keys 228. The key processor 320 can generate a corresponding number of "internal keys" or "wallet keys" such as "public and private key pairs" that can control restrictions on output by the particular metadata object linked with the particular smart contract control structure 210 compatible with the particular token.

The token transfer processor 330 can transfer and modify various tokens. The token transfer processor 330 can include an API compatible with the permission blockchain 260. The token transfer processor 330 can selectively add, modify, and delete blocks (e.g., the blocks 262, etc.) from the permission blockchain 260. The token transfer processor 330 can add, modify, and delete blocks in accordance with restrictions or interfaces of the permission blockchain 260, and can add, modify, and delete blocks independently of the restrictions or interfaces of the permission blockchain 260 at any portion or index of the permission blockchain 260. The token transfer processor 330 can transfer the restricted token 220 to or from the container 320 of the smart contract control structure 210. For example, the NFT transfer processor 350 can transfer a token in response to an indication by the key processor 320 that a token account is linked with and authorized to a particular token account.

The wallet transfer processor 340 can transfer and modify various tokens. The wallet transfer processor 340 can include an API compatible with the mobile wallet system 155. The wallet transfer processor 340 can selectively deposit, withdraw, or update tokens stored on the mobile wallet system 155. The wallet transfer processor 340 can deposit, withdraw, or update tokens in accordance with restrictions or interfaces of the mobile wallet system 155, and can deposit, withdraw, or update tokens independently of the restrictions or interfaces of the mobile wallet system 155 at any portion or index. The wallet transfer processor 340 can transfer the restricted token 220 to or from the container 320 of the smart contract control structure 210. For example, the wallet transfer processor 340 can transfer a token in response to an indication by the key processor 320 that a withdrawal or deposit is requested by the mobile wallet system 155.

The asset processor 350 can transfer and modify various tokens corresponding an asset. The asset processor 350 can include an API compatible with the mobile wallet system 170, client systems 103, and the demand networks 105 to convert received tokens from the third-party network 404 into asset tokens compatible with the system 100. The asset processor 350 can parse received token to extract an asset ID to identify the corresponding client system 103A for the received token. For example, an asset processor 350 can parse a received token to extract an asset ID that corresponds to client system 103B in demand network 105A.

The token generator 360 can generate one or more tokens in accordance with a metadata object. For example, the token generator 360 can generate multiple tokens based on a number of new metadata objects or tokens indicated by an obtained token. For example, the token generator 360 can generate one or more tokens each including a link or a reference to a parent (or primary) token (e.g., the restricted token 220, etc.) to identify a source token corresponding to the token minted by the token generator 360 (e.g., for a physical asset or a digital asset). For example, the token generator 360 can generate one or more tokens each including a link or a reference to a token from which the new tokens are minted. Thus, the token generator 360 can provide a technical improvement of validating a minting of a token based on a parameter embedded in the token. The parameter can include a hash of the parent token or the token from which the new tokens are minted, for example. Generating a token and minting a token can be used interchangeably.

The token generator 360 can also generate one or more tokens in accordance with a token or a control structure. For example, the token generator 360 can generate multiple tokens based on a number of new metadata objects or tokens indicated by an obtained token and linked with respective smart contract control structures. For example, the token generator 360 can generate one or more content tokens each linked with a particular smart contract control structure (e.g., the smart contract control structure 210, etc.) with which the respective token is compatible. The token generator 360 can modify and delete tokens linked with primary tokens or parent smart contract control structures, to update control of a partial transfer of metadata object control. For example, the token generator 360 can create a token controlling 25% of shares of a physical or digital asset and modify a token originally controlling 100% of the asset to link with a smart contract control structure controlling 75% of the asset. The token generator 360 can make the modification in accordance with an example for a change in control of 25% of the asset controlled by the original token holder.

The metadata generator 370 can generate one or more metadata objects in accordance with a received request with third-party data (e.g., various data sources). For example, the metadata generator 370 can generate multiple tokens based on a number of new metadata objects indicated by a withdrawal, deposit, or update from the mobile wallet system 155, and linked with respective smart contract control structures (e.g., the smart contract control structure 210, etc.). For example, the metadata generator 370 can generate one or more metadata objects each linked with a particular smart contract control structure (e.g., the smart contract control structure 210) by which the respective metadata object is controlled. The metadata generator 370 can modify and delete metadata objects linked with tokens or the smart contract control structures 210.

The metadata generator 370 can modify a quantitative value corresponding to a token. For example, a quantitative value corresponding to a token can indicate a value of fiat currency or MBC currency. The metadata generator 370 can modify the quantitative value of the token based on a determined value (such as from off-chain data) to generate a scaled quantitative value. For example, a token having a quantitative value of 10,000 denominated in United States Dollar (USD) can be scaled based on a determined value of 0.1 to 1,000. The token scaler can perform any linear or non-linear transformation on a quantitative value and is not limited to the example product transform discussed herein.

Figure 5:
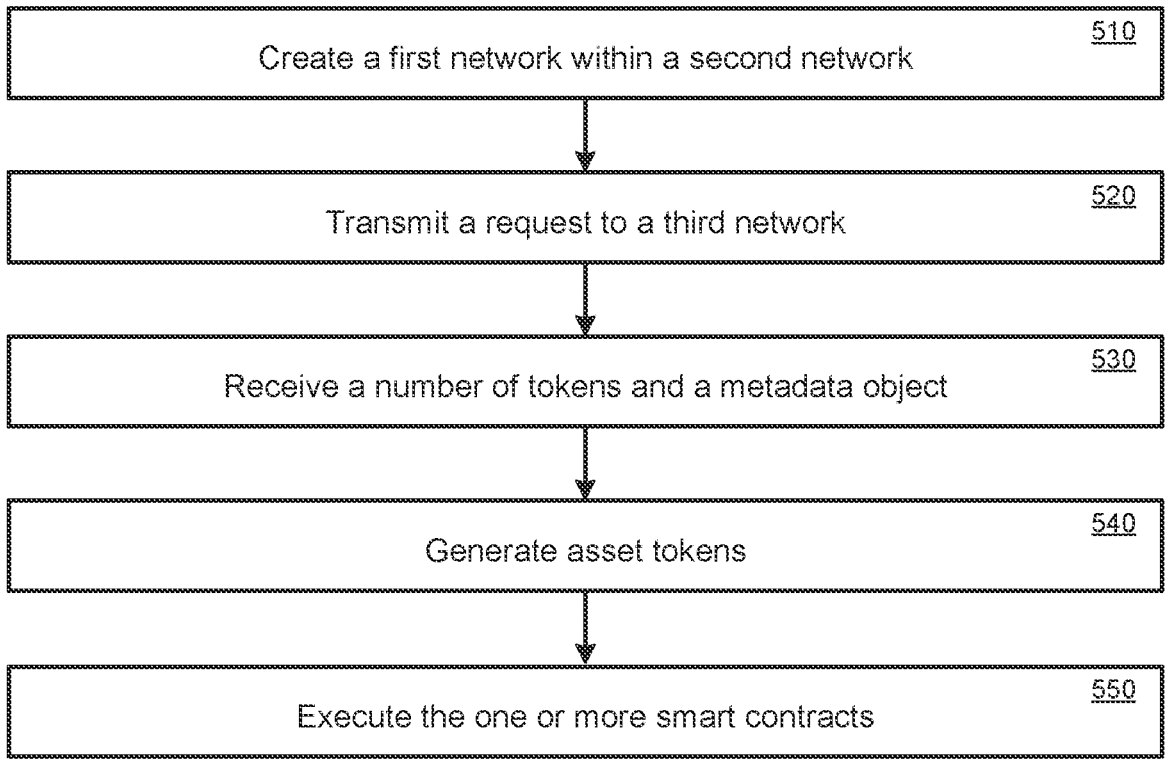
FIG. 5 depicts a method to facilitate real assets investment and the securitization engine, in accordance with present implementations.

FIG. 5 depicts a method 500 to facilitate real assets investment and the securitization engine. At least one of the example systems 100 and 400 or the example structure 200 and 300 can perform method 500. It is to be appreciated that additional, fewer, or different operations (e.g., steps, sub-steps, etc.) than what is described herein may be performed depending on the particular arrangement. In some embodiments, some, or all operations of method 500 may be performed by one or more processors executing on one or more computing devices, systems, or servers. In various embodiments, each operation may be re-ordered, added, removed, or repeated.

At block 510, the one or more processors (e.g., network processor 125, system processor 110) can create a first network (e.g., demand networks 105) within a second network (e.g., main network 402). The one or more processors can receive, a request including a tokenized deposit corresponding to an asset and the plurality of nodes for the first network. The one or more processors can create the plurality of nodes based on the tokenized deposit in the request. Each node in the plurality nodes can store an asset token, the type for the tokenized asset, and an identification for the owner, the one or more processors can use the identity token to determine a geolocation for the owner. The geolocation can correspond to a protocol in the set of protocols of the blockchain to enable asset exchange for the owner.

The first network can include a blockchain (e.g., permissioned blockchain 260) including a set of protocols (e.g., network interface) and a plurality of first nodes (e.g., client systems 103). The first network can include a type. The type can be at least one of funds, corporates, investors, financial institutions, asset managers, or partners. Each node in the plurality of first nodes can correspond to an owner, a plurality of asset tokens (e.g., tokens 220), and a type for a tokenized asset. Each node can include an identity token. The identity token can indicate a form of identification for an owner of the node. The set of protocols can validate the form of identification to enable asset exchange within the first network. The second network includes a plurality of first networks to execute asset exchange amongst one or more first networks in the plurality of first networks. Each first network in the plurality of first networks can include one or more permissions and a plurality of owners. The one or more permissions can restrict activity of the plurality owners by limiting the use of the first network based on the set of protocols.

At block 520, the one or more processors (e.g., token processor 250, network processor 125) can transmit, a request to a third network (e.g., third-party network 404 within a third-party exchange system 104). The third network can include a blockchain corresponding to a plurality of second nodes (e.g., client systems 406). The request can indicate the type for the tokenized asset, one or more nodes in the plurality of second nodes within the third network, or a number of tokens corresponding to the type for the tokenized asset. The one or more processors (e.g., network interface 135, interface controller 115, cryptographic key processor 120) can connect the plurality of nodes within the first network to the third network using a secure connectivity. The secure connectivity including a set of restrictions corresponding to the set of protocols.

At block 530, the one or more processors at the second network can receive the number of tokens (e.g., tokens 220) and a metadata object (e.g., meta data object 224) from the one or more nodes within the third network. The one or more processors can generate a log (e.g., log 408) of transactions to maintain a record of transactions within the second network. The log of transactions indicating the number of asset tokens and the metadata object within the transaction. The one or more processors can store the log of transactions in system memory (e.g., system memory 130) to monitor the transactions within the second network.

At block 540, in response to receiving the number of tokens, the one or more processors (e.g., token processor 310, token generator 260) can generate tokens by tokenizing the received number of tokens to correspond to the plurality of asset tokens (e.g., asset processor) within the first network and storing the metadata object within one or more nodes in the plurality of first nodes within the first network. The one or more processors (e.g., asset processor 350, token transfer processor 330, wallet transfer processor 340) can determine an asset in the plurality of the first networks by identifying an asset ID in the received tokens corresponding to the first network. The one or more processors can generate one or more blocks (e.g., mobile wallet system) within a corresponding node in the plurality of nodes of the first network. Each block in the one or more blocks corresponding to the received asset tokens to update the first network with the received asset tokens.

At block 550, the one or more processors (e.g., smart contract control structure 210) can execute one or more smart contracts to apply the generated asset tokens to the one or more nodes in the plurality of nodes within the first network. Applying the asset tokens to the one or more nodes can include storing, the generated asset tokens at the one or more nodes within the blockchain of the first network. The one or more processors can generate one or more smart contracts for applying the asset tokens to the plurality of asset tokens within the first network. The one or more smart contracts can execute an agreement between the first or second network and the third network to apply the asset tokens of the third network to the plurality of asset tokens within the first network.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed:

1. A method comprising:

creating, by one or more processors, a first network within a second network, wherein the first network comprises a blockchain including a set of protocols and a plurality of first nodes wherein each node in the plurality of first nodes corresponding to an owner, a plurality of asset tokens, and a type for a tokenized asset, wherein the second network comprising a plurality of first networks to execute asset exchange amongst one or more first networks in the plurality of first networks;

establishing, by the one or more processors, a secure connection with a third network that is external to the second network to prevent the third network from directly identifying the first network, the secure connection established by the third network using a public key associated with the second network to obtain limited access to the first network in accordance with a set of restrictions based on the set of protocols;

transmitting, by the one or more processors of the second network via the secure connection, a request to the third network, wherein the third network comprising a blockchain corresponding to a plurality of second nodes, wherein the request includes the type for the tokenized asset, one or more nodes in the plurality of second nodes within the third network, and a number of tokens corresponding to the type for the tokenized asset;

receiving, by the one or more processors of the second network via the secure connection, encrypted data comprising the number of tokens and a metadata object from the one or more nodes within the third network corresponding to the second network or the first network, wherein the second network causes the third network to encrypt the data to prevent fraudulent access to the number of tokens and the metadata object, wherein the data is encrypted in accordance with one or more of hashing, password protection, and masking algorithms;

in response to receiving the number of tokens, generating, by the one or more processors, asset tokens by tokenizing the number of tokens to correspond to the plurality of asset tokens network and storing the metadata object within one or more nodes in the plurality of first nodes within the first network; and executing, by the one or more processors, one or more smart contracts to apply the generated asset tokens to the one or more nodes in the plurality of nodes within the first network wherein applying the asset tokens to the one or more nodes comprising storing, the generated asset token at the one or more nodes within the blockchain of the first network.

2. The method of claim 1, wherein each first network in the plurality of first networks comprising a type, wherein the type is at least one of funds, corporates, investors, financial institutions, asset managers, or partners.

3. The method of claim 1, wherein the plurality of first networks comprising one or more permissions and a plurality of owners, wherein the one or more permissions restricts activity of the plurality of owners by limiting the use of the first network based on the set of protocols.

4. The method of claim 1, further comprising:

generating, by the one or more processors, a log of transactions to maintain a record of transactions within the second network, the log of transactions indicating the number of asset tokens and the metadata object within the transaction; and storing, by the one or more processors, the log of transactions in system memory to monitor the transactions within the second network.

5. The method of claim 1, wherein transmitting the request to the third network further comprising connecting, by the one or more processors, the plurality of nodes within the first network to the third network using the secure connection, the secure connection including the set of restrictions corresponding to the set of protocols.

6. The method of claim 1, generating the received asset tokens further comprising:

determining, by the one or more processors, an asset in the plurality of the first networks by identifying an asset ID in the received asset tokens corresponding to the first network; and generating, by the one or more processors, one or more blocks within the corresponding blockchain of the first network, each block in the one or more blocks corresponding to the received asset tokens to update the first network with the received asset tokens.

7. The method of claim 1, creating the first network within the second network further comprising:

receiving, by the one or more processors, a request comprising a tokenized deposit corresponding to an asset and the plurality of nodes for the first network; and creating, by the one or more processors, the plurality of nodes based on the tokenized deposit in the request, each node in the plurality nodes to store an asset token, the type for the tokenized asset, and an identification for the node.

8. The method of claim 1, wherein the plurality of nodes further comprising an identity token, wherein the identity token indicates a form of identification for an owner of the node, wherein the set of protocols validates the form of identification to enable asset exchange within the first network.

9. The method of claim 8, further comprising using, by the one or more processors, the identity token to determine a geolocation for the owner, the geolocation correspond to a protocol in the set of protocols of the blockchain to enable asset exchange for the owner.

10. The method of claim 1, further comprising generating, by the one or more processors, one or more smart contracts for applying the asset tokens to the plurality of asset tokens within the first network, the one or more smart contracts to execute an agreement between the first network or second network and the third network to apply the asset tokens of the third network to the plurality of asset tokens within the first network.

11. A system comprising a data processing system, the data processing system comprising memory and one or more processors configured to:

create a first network within a second network, wherein the first network comprises a blockchain including a set of protocols and a plurality of first nodes wherein each node in the plurality of first nodes corresponding to an owner, a plurality of asset tokens, and a type for a tokenized asset, wherein the second network comprising a plurality of first networks to execute asset exchange amongst one or more first networks in the plurality of first networks;

establish a secure connection with a third network that is external to the second network to prevent the third network from directly identifying the first network, the secure connection established by the third network using a public key associated with the second network to obtain limited access to the first network in accordance with a set of restrictions based on the set of protocols;

transmit, by the second network via the secure connection, a request to the third network, wherein the third network comprising a blockchain corresponding to a plurality of second nodes, wherein the request includes the type for the tokenized asset, one or more specified nodes in the plurality of second nodes within the third network, and a number of tokens corresponding to the type for the tokenized asset;

receive, by the second network via the secure connection, encrypted data comprising the number of tokens and a metadata object from the one or more nodes within the third network corresponding to the second network or the first network, wherein the second network causes the third network to encrypt the data to prevent fraudulent access to the number of tokens and the metadata object, wherein the data is encrypted in accordance with one or more of hashing, password protection, and masking algorithms;

in response to receiving the number of tokens, generate asset tokens by tokenizing the number of tokens to correspond to the plurality of asset tokens network and storing the metadata object within one or more nodes in the plurality of first nodes within the first network; and execute one or more smart contracts to apply the generated asset tokens to the one or more nodes in the plurality of nodes within the first network, wherein applying the asset tokens to the one or more nodes comprising storing, the generated asset token at the one or more nodes within the blockchain of the first network.

12. The system of claim 11, wherein each first network in the plurality of first networks comprising a type, wherein the type is at least one of funds, corporates, investors, financial institutions, asset managers, or partners.

13. The system of claim 11, wherein the plurality of first networks comprising one or more permissions and a plurality of owners, wherein the one or more permissions restricts activity of the plurality of owners by limiting the use of the first network based on the set of protocols.

14. The system of claim 11, the one or more processors are further configured to:

generate a log of transactions to maintain a record of transactions within the second network, the log of transactions indicating the number of asset tokens and the metadata object within the transaction; and store the log of transactions in system memory to monitor the transactions within the second network.

15. The system of claim 11, wherein, when transmitting the request to the third network, the one or more processors are further configured to connect the plurality of nodes within the first network to the third network using the secure connection, the secure connection including the set of restrictions corresponding to the set of protocols.

16. The system of claim 11, wherein, when generating the received asset token, the one or more processors are further configured to:

determine, an asset in the plurality of the first networks by identifying an asset ID in the received asset tokens corresponding to the first network; and generate one or more blocks within the corresponding blockchain of the first network, each block in the one or more blocks corresponding to the received asset tokens to update the first network with the received asset tokens.

17. The system of claim 11, wherein, when creating the first network within the second network, the one or more processors are further configured to:

receive a request comprising a tokenized deposit corresponding to an asset and the plurality of nodes for the first network; and create the plurality of nodes based on the tokenized deposit in the request, each node in the plurality nodes to store an asset token, the type for the tokenized asset, and an identification for the node.

18. The system of claim 11, wherein the plurality of nodes further comprising an identity token, wherein the identity token indicates a form of identification for an owner of the node, wherein the set of protocols validates the form of identification to enable asset exchange within the first network.

19. The system of claim 18, the one or more processors are further configured to use the identity token to determine a geolocation for the owner, the geolocation correspond to a protocol in the set of protocols of the blockchain to enable asset exchange for the owner.

20. The system of claim 11, the one or more processors are further configured to generate one or more smart contracts for applying the asset tokens to the plurality of asset tokens within the first network, the one or more smart contracts to execute an agreement between the first network or second network and the third network to apply the asset tokens of the third network to the plurality of asset tokens within the first network.

* * * * *